(12) United States Patent
Koskinen

(10) Patent No.: US 8,488,527 B2
(45) Date of Patent: Jul. 16, 2013

(54) APPARATUS AND METHOD FOR FACILITATING RADIO RESOURCE DIMENSIONING FOR COMMUNICATION SERVICES

(75) Inventor: Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 463 days.

(21) Appl. No.: 12/834,570

(22) Filed: Jul. 12, 2010

(65) Prior Publication Data
US 2012/0008525 A1    Jan. 12, 2012

(51) Int. Cl.
    *H04Q 7/00*   (2006.01)
(52) U.S. Cl.
    USPC .......................... 370/328; 370/329; 370/330
(58) Field of Classification Search
    USPC ............... 370/328, 329, 330, 395.4
    See application file for complete search history.

(56) References Cited

U.S. PATENT DOCUMENTS

| | | | |
|---|---|---|---|
| 6,738,819 B1 * | 5/2004 | Li et al. .................... | 709/229 |
| 7,885,216 B2 * | 2/2011 | Voyer et al. ............... | 370/310.2 |
| 2002/0181436 A1 | 12/2002 | Mueckenheim et al. | |
| 2003/0078065 A1 * | 4/2003 | Hoagland et al. ........ | 455/517 |
| 2003/0130819 A1 * | 7/2003 | Stewart ..................... | 702/182 |
| 2005/0259662 A1 * | 11/2005 | Kim et al. ................. | 370/395.4 |
| 2006/0140115 A1 * | 6/2006 | Timus et al. .............. | 370/230 |
| 2007/0032200 A1 * | 2/2007 | Taneja ....................... | 455/70 |
| 2007/0195741 A1 | 8/2007 | Cho et al. | |
| 2008/0049663 A1 * | 2/2008 | Voyer et al. .............. | 370/328 |
| 2008/0274759 A1 | 11/2008 | Chen et al. | |
| 2008/0298337 A1 | 12/2008 | Rezaei et al. | |
| 2008/0311949 A1 | 12/2008 | Koskinen et al. | |
| 2008/0318558 A1 | 12/2008 | Bouazizi et al. | |
| 2009/0129342 A1 | 5/2009 | Hwang et al. | |
| 2009/0264064 A1 | 10/2009 | Hyun et al. | |
| 2009/0305716 A1 * | 12/2009 | Ono ........................... | 455/452.2 |
| 2010/0150088 A1 * | 6/2010 | Dos Santos et al. ...... | 370/329 |

FOREIGN PATENT DOCUMENTS

| | | |
|---|---|---|
| EP | 2 175 673 A1 | 4/2010 |
| EP | 2 237 633 A1 | 10/2010 |
| GB | 2 470 066 A | 11/2010 |
| WO | WO 2009/133444 | 11/2009 |
| WO | WO 2009/141016 A1 | 11/2009 |

OTHER PUBLICATIONS

Santosh Kumar Dornal; *LTE Whitepaper*; http://wired-n-wirless.blogspot.com; pp. 1-26, website visited Oct. 8, 2009.
Wired n Wireless: LTE Radio Interface; http://wired-n-wireless.blogspot.com/2009/09/lte-radio-interface.html; website visited Dec. 17, 2009.

(Continued)

*Primary Examiner* — Chuong T Ho
(74) *Attorney, Agent, or Firm* — Alston & Bird LLP

(57) ABSTRACT

An example apparatus is provided that receives at least one parameter value, for each of one or more communication bearers, where the at least one parameter value, for a communication bearer, describes a data rate probability distribution, for the same bearer, associated with time intervals with a fixed time duration. The apparatus estimates an amount of radio resources to allocate to at least one communication bearer of the one or more communication bearers, based at least in part on the received parameter values and the fixed time duration. The apparatus then allocates the estimated amount of radio resources to the at least one communication bearer of the one or more communication bearers.

18 Claims, 5 Drawing Sheets

OTHER PUBLICATIONS

Vladimir Vukadinović; *Bit-Rate Allocation, Scheduling, and Statistical Multiplexing for Wireless Video Streaming*; Licentiate Thesis; School of Electrical Engineering; KTH, Stockholm, Sweden; Jun. 2008; pp. 1-17.

*E-MBMS Functions of Statistical Multiplexing*; 2GPP TSG RAN WG3 #59bis; Oct. 8-12, 2007, Shanghai, China; pp. 1-7.

3GPP TS 23.246 V9.3.0 (Dec. 2009); $3^{rd}$ Generation Partnership Project; Technical Specification Group Services and Architecture; Multimedia Broadcast/Multicast Service (MBMS); Architecture and Functional Description (Release 9); pp. 1-63.

3GPP TS 23.401 V9.3.0 (Dec. 2009); $3^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 9); pp. 1-45.

Andrews, Matthew et al: "CDMA Data Qos Scheduling on the Forward Link with Variable Channel Conditions"; Bell Laboratories, Lucent Technologies, 600-700 Mountain Avenue, Murray Hill, NJ 07974-0636; Apr. 2, 2000; pp. 1-45.

Andrews, Matthew et al: "Providing Quality of Service Over a Shared Wireless Link"; IEEE Communication Magazine; Feb. 2001; pp. 150-154.

Pradap, K.V. et al: "Uplink Buffer Status Reporting for Delay Constrained Flows in 3GPP Long Term Evolution"; Wireless Communications and Networking Conference, 2009, WCNC 2009, IEEE, pp. 1-6; Apr. 5-8, 2009.

International Search Report and Written Opinion for International Application No. PCT/IB2011/053064, mailed Nov. 8, 2011.

* cited by examiner

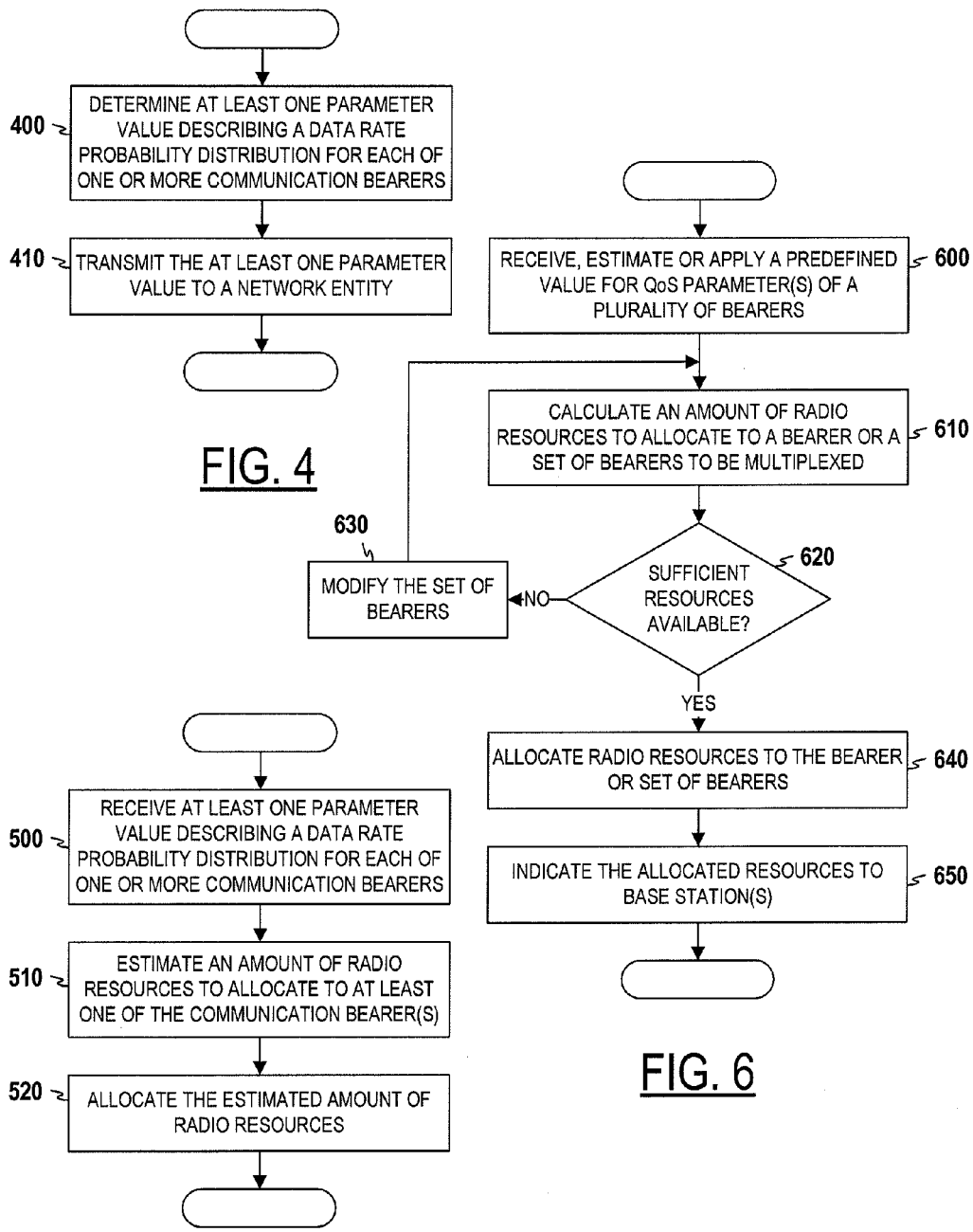

APPARATUS AND METHOD FOR FACILITATING RADIO RESOURCE DIMENSIONING FOR COMMUNICATION SERVICES

TECHNICAL FIELD

Example embodiments of the present invention generally relate to quality of service and allocation of resources for communication services and, more particularly, relate to exchange of quality of service parameters between different entities and the allocation of resources for services based at least in part on exchanged quality of service parameters.

BACKGROUND

The modern communications era has brought about a tremendous expansion of wireline and wireless networks. Computer networks, television networks and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier and/or faster information transfer and convenience, telecommunication industry service providers are developing improvements to existing networks. In this regard, wireless communication has become increasingly popular in recent years due, at least in part, to reductions in size and cost along with improvements in battery life and computing capacity of mobile electronic devices. As such, mobile electronic devices have become more capable, easier to use, and cheaper to obtain. Due to the now ubiquitous nature of mobile electronic devices, people of all ages and education levels are utilizing mobile terminals to communicate with other individuals or contacts, receive services and/or share information, media and other content.

Current and future networking technologies continue to facilitate ease of information transfer and convenience to users. In order to provide easier and/or faster information transfer and convenience, telecommunication industry service providers are developing improvements to existing networks. For example, the evolved universal mobile telecommunications system (UMTS) terrestrial radio access network (E-UTRAN) is currently being developed. The E-UTRAN, which is also known as Long Term Evolution (LTE) or 3.9G, is aimed at upgrading prior technologies by improving efficiency, lowering costs, improving services, making use of new spectrum opportunities, and providing better integration with other open standards.

One of the areas of development of E-UTRAN is broadcast and multicast communications, known as multimedia broadcast and multicast service (MBMS) in E-UTRAN parlance. Broadcast and multicast communications are generally a form of point-to-multipoint communications in which information is simultaneously transmitted from a single source to multiple destinations. Broadcast and multicast communications may be used to transmit a number of different types of content to a large number of people from emergency or general alert messages, e.g., weather alerts, to broadcast television, film, audio and other media content, e.g., newspapers.

BRIEF SUMMARY

In MBMS, quality of service (QoS) may be applied using network-controlled and network-initiated dedicated bearers. Generally, a "bearer" is a logical channel or information transmission path of a defined capacity, delay, bit error rate or the like, which in various contexts may be referred to as a MBMS bearer, an evolved packet system (EPS) bearer or the like. In $3^{rd}$ Generation Partnership Project, 3GPP, the QoS concept is summarized in 3GPP Technical Specification (TS) 23.401, v9.3.0 (December 2009).

A proposed evolution of LTE MBMS includes the application of statistical multiplexing (StatMux). Statistical multiplexing is a type of communication link sharing. In statistical multiplexing, a communication channel is shared by several variable bit-rate digital channels. A statistical multiplexer in a communication system, usually, uses statistical knowledge about the system in order to improve resource efficiency. It is desirable that the sharing of link resources between the different channels takes into account the instantaneous traffic demands of the data streams that are transferred over each channel. Statistical multiplexing may improve the overall performance of services or service sessions by using statistical information, reflecting and/or helping in estimating/modeling time variations in data rate, when allocating resources to one or more communication channels.

In applying statistical multiplexing, for example to MBMS, it may be desirable to resolve the multiplexing of communication channels using the quality of service (QoS) parameters of the respective channels. Thus for a given set of service sessions, or MBMS bearers, it may be desirable to determine, estimate, or statistically characterize, the overall data rate for which to reserve radio resources to be dynamically shared by the service sessions or bearers. Conversely, for example, given a readily made radio resource reservation, it may be desirable to determine the number of service sessions, or bearers, that may be multiplexed in a communication link with the reserved resources. Alternatively, it may be desirable to determine if a newly available service session, or MBMS bearer, with given QoS parameters may be multiplexed on the common resource together with any pre-existing service sessions or bearers.

According to one example aspect of example embodiments of the present invention, an apparatus is provided that includes at least one processor and at least one memory including computer program code. The at least one memory and the computer program code are configured to, with the at least one processor, cause the apparatus to perform at least a number of operations. In this regard, the apparatus is caused to receive at least one parameter value, for each of one or more communication bearers, where the at least one parameter value, for a communication bearer, describes a data rate probability distribution, for the same bearer, associated with time intervals with a fixed time duration.

The at least one parameter value may include at least one of an average data rate value, a data rate variance value, a percentile data rate value, associated with a probability value indicating a probability of a the data rate value being exceeded, or the probability value. The average data rate value, the data rate variance value and the percentile data rate value may be associated with time intervals with the fixed time duration. And the fixed time duration may be one of a time duration value received with the parameter values, or a time duration value already known to the apparatus.

The apparatus of this example aspect also caused to estimate an amount of radio resources to allocate to at least one communication bearer of the one or more communication bearers, based at least in part on the received parameter values and the fixed time duration. The apparatus is also caused to allocate the estimated amount of radio resources to the at least one communication bearer of the one or more communication bearers.

The apparatus being caused to estimate an amount of radio resources may include the apparatus being caused to estimate an amount of radio resources to allocate to a multiplex of communication bearers as a function of the received parameters values, or estimate at least one new parameter value describing a data rate probability distribution associated with time intervals with a new fixed time duration. In such instances, the data rate probability distribution may correspond to at least one of a data rate of a communication bearer or a data rate of a multiplex of communication bearers. Also in such instances, a multiplex of communication bearers may include a set of communication bearers multiplexed on a common communication channel.

The apparatus being caused to estimate an amount of radio resources to allocate to a multiplex of communication bearers may include the apparatus being caused to estimate, for the multiplex of communication bearers, a mean and variance as a function of means and variances of data rates on the respective bearers of the multiplex.

The apparatus being caused to allocate the estimated amount of radio resources may include the apparatus being caused to allocate the estimated amount of radio resources to the multiplex of communication bearers. In such instances the at least one memory and the computer program code may be further configured to, with the at least one processor, cause the apparatus to further determine if sufficient radio resources are available for the multiplex of communication bearers as a function of the estimated amount of radio resources, and modify the communication bearers forming the multiplex of communication bearers when sufficient radio resources are not available. The determination if sufficient radio resources are available and the modification of communication bearers may be repeated until the modified multiplex of communication bearers has sufficient radio resources available.

The at least one memory and the computer program code may be further configured to, with the at least one processor, cause the apparatus to further prepare an indication of the allocated resources or the at least one communication bearer assigned to allocated resources for transmission to one or more base stations for scheduling the at least one communication bearer on the allocated radio resources.

BRIEF DESCRIPTION OF THE DRAWING(S)

Having thus described embodiments of the invention in general terms, reference will now be made to the accompanying drawings, which are not necessarily drawn to scale, and wherein:

FIGS. 4, 5 and 6 illustrate flowcharts including various operations in methods of example embodiments of the present invention.

DETAILED DESCRIPTION

Figure 1:
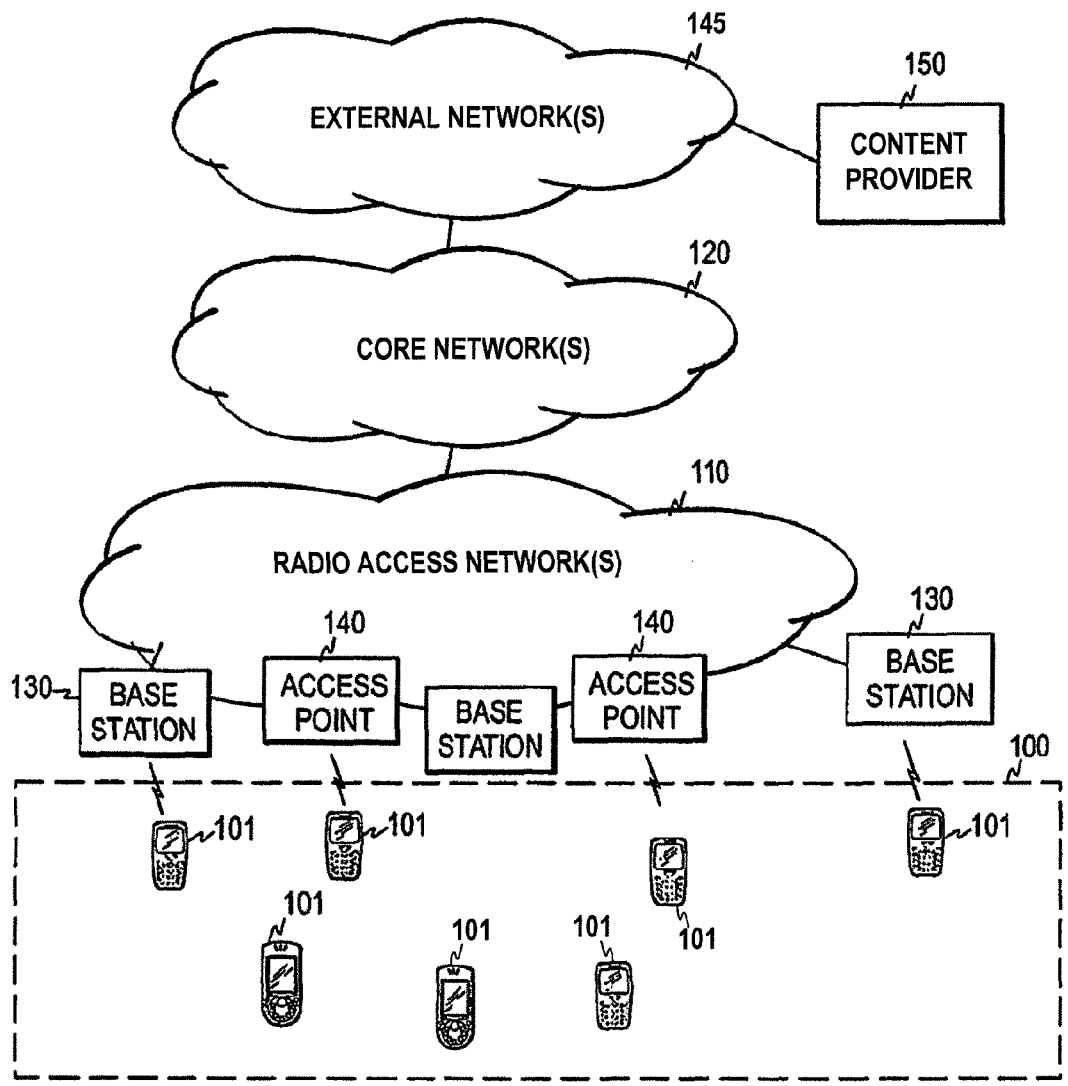
FIG. 1 illustrates a general communication environment according to example embodiments of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like. While the concepts described herein may be applicable to multimedia broadcast communications and networks, in general, the description that follows may be directed to multimedia broadcast and multimedia multicast service (MBMS), evolved MBMS (E-MBMS) or the like (generally referred to herein as "MBMS") for 3GPP LTE E-UTRANs.

The terms "data," "content," "information" and similar terms may be used interchangeably, according to some example embodiments of the present invention, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Further, as used herein, the term "circuitry" refers to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

FIG. 1 illustrates a general communication environment in which example embodiments of the present invention may be applied. The communication environment includes three interacting domains: a user equipment domain 100, an access domain including several radio access networks (RANs) 110, and a backbone domain including a core network 120.

The communication environment, of FIG. 1, includes, a mobile network and one or more short-range wireless networks, and therefore includes one or more base stations 130 (or nodes B or eNB elements), access points 140 or the like. Examples of these networks may include 3GPP radio access networks, Universal Mobile Telephone System (UMTS) radio access UTRAN (Universal Terrestrial Radio Access Network), Global System for Mobile Communications (GSM) radio access networks, Code Division Multiple Access (CDMA) 2000 radio access networks, Wireless Local Area Networks (WLANs) such as IEEE 802.xx networks (e.g., 802.11a, 802.11b, 802.11g, 802.11n, etc.), world interoperability for microwave access (WiMAX) networks, IEEE 802.16, and/or wireless Personal Area Networks (WPANs) such as IEEE 802.15, Bluetooth, low power versions of Bluetooth, infrared (IrDA), ultra wideband (UWB), Wibree, Zigbee or the like. 3GPP radio access networks may include, for example, 3G (e.g., GERAN) or 3.9G (e.g., UTRAN Long Term Evolution (LTE) or Super 3G) or E-UTRAN (Evolved UTRAN) networks. Generally, a radio access network may refer to any 2G, 3G, 4G or intervening or higher generation mobile communication network and their different versions, radio frequency (RF) or any of a number of different wireless networks, as well as to any other wireless radio access network that may be arranged to interwork with such networks.

The user equipment domain 100 includes a plurality of user equipment (UE) 101, mobile terminals or the like. In this context, the user equipment may be multimode user equipment. Multimode user equipment may here refer to user equipment that has at least two operation modes, i.e., at least two radio interfaces based on different connectivity standards. Although one operation mode may be provided for communicating with the mobile network, the user equipment may also be provided with one or more other operation modes, in which a short-range radio of the user equipment may be active. The user equipment may have different states with respect to each operation mode, and the states allowed concurrently depend on the implementation of the user equipment.

The radio access network 110 and/or core network 120 may further be connected to one or more external networks 145, such as an Internet Protocol (IP) network (e.g., the Internet). The core network and/or the external network may include one or more content providers 150 to provide respective services to other apparatuses such as the user equipment 101.

While the concepts described herein may be applicable to multimedia broadcast communications and networks, in general, the description that follows may be directed to multimedia broadcast/multicast service (MBMS), evolved MBMS (E-MBMS) or the like, generally referred to herein as "MBMS", for 3GPP LTE E-UTRANs. According to example embodiments of the present invention, the use of quality of service (QoS) parameters in allocating resources to one or more service sessions and/or multiplexing data streams of different service sessions may be implemented in communication applications other than MBMS. For example, quality of service parameters associated with different logic digital channels may be used by a streaming server, a network element and/or the like in allocating resources to one or more of the logic channels in accordance with example embodiments of the present invention. The logic channels may be associated with MBMS service sessions, streaming sessions, teleconference sessions, data communication sessions and/or the like.

Figure 2A:
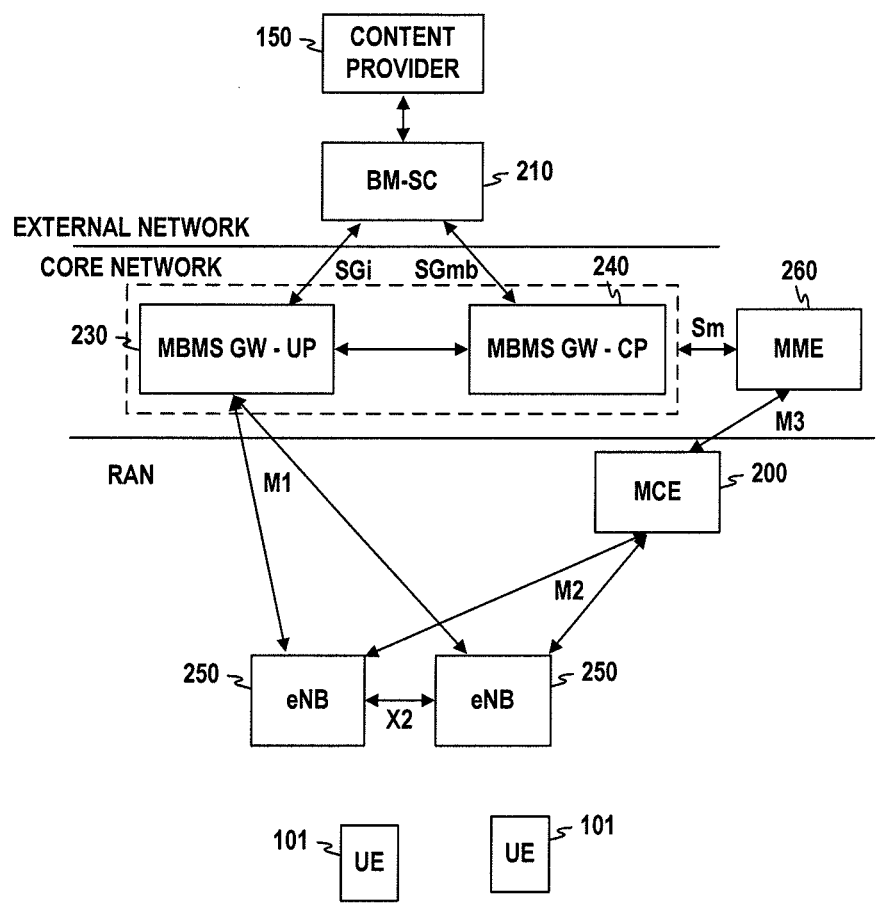
FIGS. 2a and 2b illustrate a segment of the communication environment of FIG. 1 according to various example embodiments of the present invention.
Figure 2B:
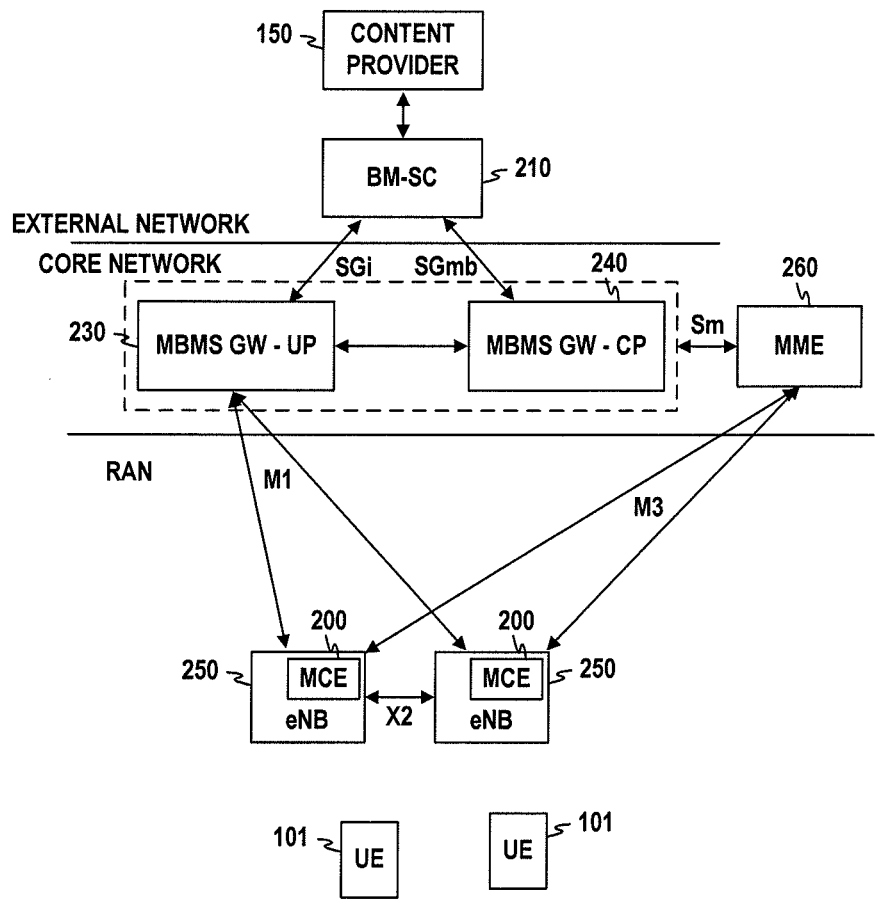

Reference is now made to FIGS. 2a and 2b, which illustrate a network segment of the communication environment of FIG. 1 according to various example embodiments of the present invention. The segment includes 3GPP LTE E-UTRAN employing alternative configurations of a MBMS coordination entity (MCE) 200. In the example embodiment of FIG. 2a, the MCE may be embodied as a separate network apparatus and serve one or more base stations 250. In the example embodiment of FIG. 2b, an MCE may be embodied at each of one or more base stations.

The segment of the communication environment of FIGS. 2a and 2b includes a broadcast/multicast service center (BM-SC) 210 in an external network 145. The BM-SC may serve as an entry point for content delivery services from content providers 150, within the network segment. Each content delivery service may be associated with a respective bearer, which in various contexts may be referred to as a MBMS bearer, an evolved packet system (EPS) bearer or the like. The BM-SC may configure and control the EPS bearers, for the MBMS, to a core network 120 and may schedule and deliver transmissions for the MBMS. Examples of a core network include an evolved packet core (EPC) network. The BM-SC may also provide service announcements and information for user equipment (UE) 101 to join MBMS. Information provided by the BM-SC includes, without limitation, a multicast service identifier, Internet protocol multicast addresses, time of transmission, media descriptions, and the like. The BM-SC may also be used to generate subscription records for information transmitted by a content provider and manage security functions specified by 3GPP for a multicast mode.

The core network may include MBMS gateways (MBMS GWs) both in a user plane (MBMS GW-UP) 230 and a control plane (MBMS GW-CP) 240. During session initiation, the MBMS GW-UP, with an interface to the BM-SC 210 labeled Gi, may assign a private Internet protocol (IP) multicast address used for a user data stream distribution towards the base stations or eNBs 250. The MBMS GW-UP entity may also be responsible for forwarding IP packets received from the BM-SC to the base stations that have joined the private IP multicast group of a particular MBMS stream. In case of a single frequency network (SFN) transmission mode, the MBMS GW-UP may add to the forwarded data unit information based on which the base stations are able to have an air interface transmission synchronization. In single-cell transmission mode, the MBMS GW-UP may, for example, supply burst transmission timing information to the transmitted service data. The MBMS GW-UP may, alternatively, simply transmit the service data to the base stations. The interface between MBMS GW-UP and the base stations is labeled M1.

The MBMS GW-CP 240 is a functional entity that takes care of MBMS session management in the EPC domain. The BM-SC 210 and the MBMS GW-CP 240 are coupled through an interface labeled Gmb. The MBMS GW-CP may deliver MBMS session start/stop messages to the base stations 250 in the targeted MBMS service area. These messages may be delivered to the base stations via a mobility management entity (MME) 260 and the MCE 200. The MME is generally responsible for the tracking and paging of UEs 101, and participates in the bearer activation/deactivation process. The interface between the MBMS GW, including the MBMS GW-CP 240 and MBMS GW-UP 230, and the MME 260 is labeled Sm. The interface between the MME and MCE is labeled M3. In the configuration of FIG. 2a in which the MCE is separate from the base stations, an interface M2 is included between the MCE and the base stations. In the configuration of FIG. 2b in which the base stations include respective MCEs, the interface M3 couples the MME to the base stations.

The MCE 200, also known as an MBMS radio resource management entity or an operations and maintenance server, performs radio resource management. In addition, the MCE may be involved in the handling of counting results, e.g., in a shared carrier case.

The segment of the communication environment of FIGS. 2a and 2b may also include radio access network(s) 110, with base stations 250 defining a multimedia broadcast single frequency network (MBSFN) area for user equipments 101 therein. The base stations may be responsible for the air interface operation. The base stations may control the mapping of MBMS areas to cells. In the single frequency network (SFN) transmission mode, the base stations that are part of the same SFN area may be synchronized. However, in the single-cell transmission mode, the base stations need not be synchronized. It should be noted that in select example embodiments, base stations may be only loosely synchronized for single-cell transmission mode, while in other select example embodiments, the base stations are not synchronized at all. The communication link between the base stations in FIGS. 2a and 2b is labeled X2.

Figure 3:
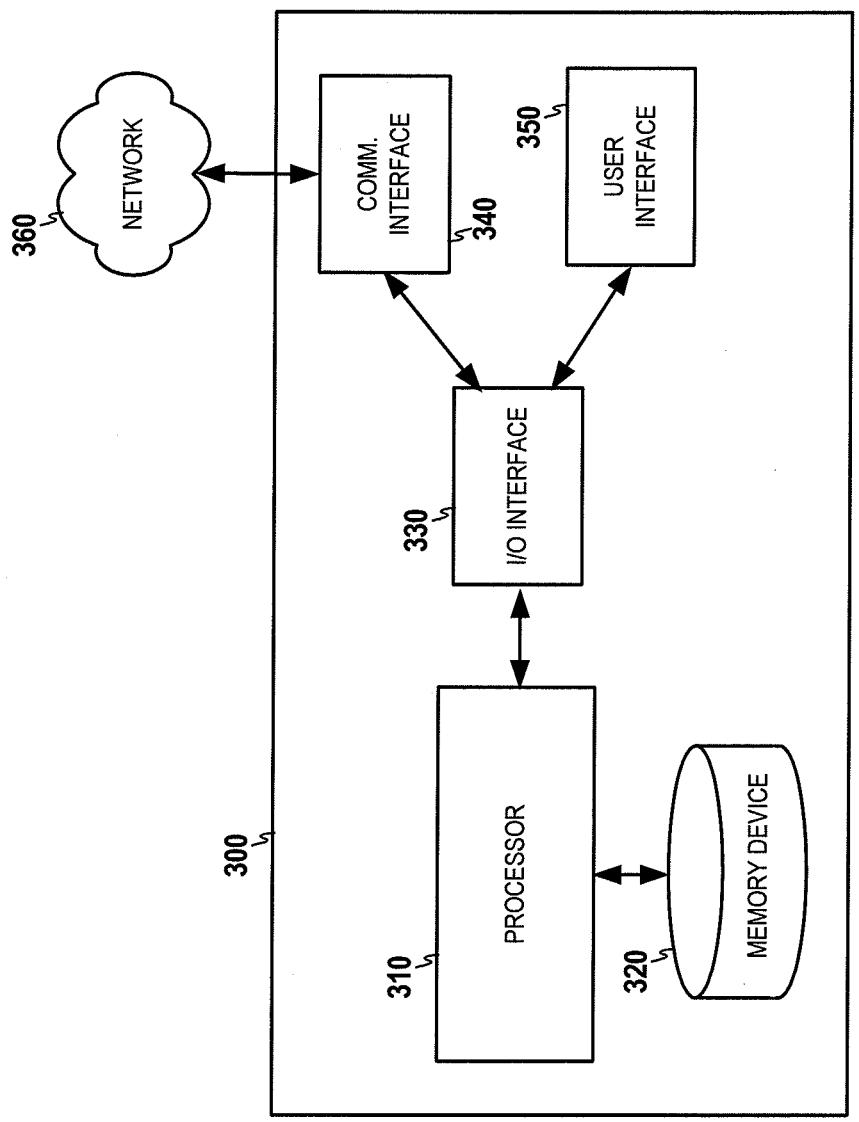
FIG. 3 illustrates an apparatus that may be configured to operate within the network architecture of FIG. 1, according to various example embodiments of the present invention.

Reference is now made to FIG. 3, which illustrates an apparatus 300 according to example embodiments of the present invention configured to perform the various functionalities described herein. As shown and described herein, the example apparatus may be configured to function as, or otherwise implement, one or more of the network components depicted in FIGS. 1, 2a and/or 2b, e.g., user equipment 101, content provider 150, MCE 200, BM-SC 210, content provider 215, UE 101, MBMS GW-UP 230, MBMS GW-CP 240, MME 260, or base stations 250. The example apparatus depicted in FIG. 3 may also be configured to perform example methods of the present invention, such as those described with respect to FIGS. 4, 5 and 6.

In some example embodiments, the apparatus 300 may be embodied as, or included as, a component of a communications device with wired or wireless communications capabilities. In this regard, the apparatus may be configured to operate in accordance with the functionality of one or more network elements as described herein. The example apparatus may include, or otherwise be in communication with, one or more processors 310, one or more memory devices 320, one or more Input/Output (I/O) interfaces 330, one or more communications interfaces 340 and/or one or more user interfaces 350. In FIG. 3 one of each of these components is being shown. The processor may be embodied as various means for implementing the various functionalities of example embodiments of the present invention including, for example, a microprocessor, a coprocessor, a controller, a special-purpose integrated circuit such as, for example, an application specific integrated circuit (ASIC), a field programmable gate array (FPGA), a hardware accelerator, a processing circuitry and/or the like. According to an example embodiment, the processor may be representative of a plurality of processors, or one or more multiple core processors, operating in concert. Further, the processor may be comprised of a plurality of transistors, logic gates, a clock, e.g., oscillator, other circuitry, and/or the like to facilitate performance of the functionality described herein. The processor may, but need not, include one or more accompanying digital signal processors. In some example embodiments, the processor is configured to execute instructions stored in the memory device or instructions otherwise accessible to the processor. The processor may be configured to operate such that the processor causes the apparatus to perform various functionalities described herein.

Whether configured as hardware or via instructions stored on a computer-readable storage medium, or by a combination thereof, the processor 310 may be an entity configured to perform, and/or cause the apparatus 300 to perform, operations according to embodiments of the present invention while configured accordingly. Thus, in example embodiments where the processor is embodied as, or is part of, an ASIC, FPGA, or the like, the processor is specifically configured hardware for conducting, or causing the performance of, the operations described herein. Alternatively, in example embodiments where the processor is embodied as an executor of instructions stored on a computer-readable storage medium, the instructions specifically configure the processor to perform, and/or cause the performance of, the algorithms and operations described herein. In some example embodiments, the processor is a processor of a specific device configured for employing example embodiments of the present invention by further configuration of the processor via executed instructions for performing, and/or causing the performance of, the algorithms, methods, and operations described herein.

The memory device 320 may be one or more computer-readable storage media that may include volatile and/or non-volatile memory. In some example embodiments, the memory device includes Random Access Memory (RAM) including dynamic and/or static RAM, on-chip or off-chip cache memory, and/or the like. Further, the memory device may include non-volatile memory, which may be embedded and/or removable, and may include, for example, read-only memory, flash memory, magnetic storage devices, e.g., hard disks, floppy disk drives, magnetic tape, etc., optical disc drives and/or media, non-volatile random access memory (NVRAM), and/or the like. The memory device may include a cache area for temporary storage of data. In this regard, at least a portion or the entire memory device may be included within the processor 310.

Further, the memory device 320 may be configured to store information, data, applications, computer-readable program code instructions, and/or the like for enabling the processor 310 and the example apparatus 300 to carry out various functions in accordance with example embodiments of the present invention described herein. For example, the memory device may be configured to buffer input data for processing by the processor. Additionally, or alternatively, the memory device may be configured to store instructions for execution by the processor.

The I/O interface 330 may be any device, circuitry, or means embodied in hardware, software or a combination of hardware and software that is configured to interface the processor 310 with other circuitry or devices, such as the communications interface 340 and/or the user interface 350. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 300 to perform, various functionalities of the present invention.

The communication interface 340 may be any device or means embodied in hardware, software or a combination of hardware and software that is configured to receive and/or transmit data from/to one or more networks 360, e.g., radio access networks 110, core networks 120, external networks 145, etc., and/or any other device or module in communication with the example apparatus 300. The processor 310 may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 340 may be configured to provide for communications in accordance with any of a number of wired or wireless communication standards. In some example embodiments, the communications interface may be configured to communicate in accordance with various techniques including, as explained above, any of a number of 2G, 3G, 4G or intervening or higher generation mobile communication technologies, radio frequency (RF), IrDA or any of a number of different wireless networking techniques. The communications interface may also be configured to support communications at the network layer, possibly via Internet Protocol (IP).

The user interface 350, which is optional and may not be included in all implementations of the apparatus 300, may be in communication with the processor 310 to receive user input via the user interface and/or to present output to a user as, for example, audible, visual, mechanical or other output indications. The user interface may include, for example, a keyboard, a mouse, a joystick, a display, e.g., a touch screen display, a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions, e.g., software and/or firmware, stored on a memory accessible to the processor, e.g., the memory device 320. In some example embodiments, the user interface circuitry is configured to facilitate user control of at least some functions of the apparatus 300 through the use of a display and configured to respond to user inputs. The processor may also comprise, or be in communication with, display circuitry configured to display at least a portion of a user interface, the display and the display circuitry configured to facilitate user control of at least some functions of apparatus.

According to an example embodiment, multiplexing is applied to logical channels associated with, for example, streaming sessions, data transmission, teleconference streams, and/or the like. In other words, the multiplexing of data streams based, at least in part, on statistical information of the data streams, according to example embodiments of the present invention, is not to be restricted to MBMS and may be applied in different other communication applications. In accordance with an example embodiment of the present invention, the EPS bearers for multiple MBMS services, may be multiplexed so that those bearers share a common transport channel, multicast channel (MCH) or the like to which a set of radio resources are allocated. These radio resources, according to various example embodiments, include frames, subframes, time slots for transmitting data, bandwidth and/or the like. The EPS bearers may be statistically multiplexed, for example, in accordance with frequency-division multiplexing techniques, time-division multiplexing techniques and/or a multiplexing in both time and frequency.

More particularly, for example, the MCE 200 may make a radio resource reservation, such as a semi-static, e.g., fixed-capacity, radio resource reservation. A number of EPS bearers for respective MBMS services may be dynamically scheduled on the reserved radio resources. In dynamically scheduling the EPS bearers, the MCE 200 determines, for example, a subset from a set of bearers based, at least in part, on the capacity of the reserved radio resources and statistical information associated with the bearers. Similarly, the MCE may add one or more EPS bearers to multiplexed EPS bearers for which the MCE has already reserved radio resources. In each scheduling period, within which the radio resource reservation may also occur, the base stations 250 may schedule the data addressed to that scheduling period from each of the multiplexed services back to back, such as by applying a well-defined scheduling order for the services. The scheduling information that assigns each data packet of a MBMS service to a specific scheduling period may be signaled in the SYNC protocol, e.g., according to 3GPP TS 25.446, which may be terminated in the BM-SC 210.

In an example embodiment, the radio resources for a multiplex of services are reserved as a periodically repeating pattern of subframes. The multiplex of services are scheduled on those reserved subframes also periodically. In each MCH scheduling period, the data scheduled from the services in that scheduling period, as derived from time stamps in their packet headers, are transmitted in a predefined order of services. For example, first all the data from the first service to be scheduled in that period is transmitted, after which the data scheduled from the second service is transmitted and so on. From the point of view of the MCE the radio-resource reservation problem is therefore how many subframes are to be reserved for the MCH in each scheduling period. Each subframe corresponds to an amount of data to be transmitted. According to an example embodiment of the invention, the MCE makes use of information related to the probability distribution of the multiplexed amount of data to be scheduled in each scheduling period, in allocating radio resources. The MCE, for example, derives information related to the probability distribution of the multiplexed amount of data based on information related to the separate probability distribution for each service.

The BM-SC 210 may assign to each EPS bearer one or more quality of service (QoS) parameters. These parameters may include a QoS class identifier (QCI), which is an index reference to a QoS class with pre-defined, e.g., as specified in 3GPP TS 23.203, values for (a) packet delay budget, (b) priority for the former if compromising across bearers is required, and (c) packet error loss rate. The QoS class also includes an allocation and retention priority (ARP), which may be used to decide whether a bearer establishment/modification request should be accepted or rejected depending on resource limitations. Some of the QoS classes may also be associated with a guaranteed bitrate (GBR) and/or a maximum bitrate (MBR). Bearers of classes associated with a GBR may be referred to as GBR bearers. The GBR may represent the bitrate that may be expected to be provided by a GBR bearer; and the MBR may represent a limit on the bitrate that may be expected to be provided by a GBR bearer. Generally, the MBR may be greater than or equal to the GBR. There may be additional bitrate parameters such as aggregate bitrate parameters including an aggregate maximum bitrate per Access Point Name or per User Equipment (APN/UE AMBR).

To cater for multiplexing of bearers and the related radio resource allocation/dimensioning, example embodiments of the present invention propose implementing a QoS scheme including additional or alternative QoS parameters that capture information regarding a probability distribution of the amount of offered data, or the bitrate, within one or more time intervals of a given-length on a bearer. The duration, or length, of each of the one or more time intervals is used, for example, to deduce a better probabilistic/statistical characterization of the data bitrate. Improving probabilistic/statistical characterization of data rate, instead of using the currently used QoS parameters, e.g., Guaranteed Bitrate and Maximum Bitrate, improves radio resource allocation. In computing/estimating the bitrate, the amount of data offered over a time interval is averaged over the same time interval. If samples of the bitrate are computed for example over relatively large time intervals, the variance of the computed samples may be relatively small and therefore may not reflect the fluctuations in the bitrate over time. On the other hand if the time intervals, over which bitrate samples are evaluated, are relatively small then the corresponding variance may be relatively large. For example when the averaging time intervals, e.g. time intervals over which amount of offered data is averaged to compute bitrate samples, are of very small length, some time intervals may be associated with zero or little amount of data offered while other time intervals may be associated with significant amount of data offered. As such the variance of the bitrate samples is high. High bitrate variance leads to an increase in the allocated network resources. According to an example embodiment of the invention, if the resources allocating entity is aware of the length of the time interval associated with offered amounts of data, or over which bitrate samples were evaluated, then the same entity may translate the statistics, or probability distribution, of the bitrate to correspond to another averaging time interval.

For the sake of illustration, consider an example where bitrates are calculated/estimated over time intervals of length T. Assume that the amount of data offered over the different time intervals have identically independent probability distributions each with mean M and variance V. The bitrate, calculated over each of the time intervals by averaging the corresponding offered amounts of data, has a probability distribution with mean $M/T$ and variance $V/(T^2)$. Using time intervals of length 2T, instead of length T, leads to estimated bitrate with probability distribution having the same mean $(M+M)/(2T)=M/T$ but a variance $(V+V)/(2T)^2=V/(2T^2)$. This example illustrates the effect of the length of the time intervals used to evaluate the statistical parameters over the probability distribution of the estimated data rate, e.g. bitrate.

Reference is thus now made to FIGS. 4, 5 and 6, which illustrate various operations in a method according to an example embodiment of the present invention. According to an example embodiment, the operations shown in FIG. 4 may be performed by the BM-SC 210, and those shown in FIGS. 5 and 6 may be performed by the MCE 200.

As shown at block 400 of FIG. 4, the BM-SC determines at least one parameter value, for each of one or more communication bearers. The parameter value(s), for a communication bearer, describe a data rate probability distribution, for the same bearer, associated with time intervals with a fixed time duration. In this regard, the BM-SC may determine one or more values for one or more QoS parameters identifying data rates over one or more bearers. For example, each EPS bearer, for a respective MBMS service, is associated with at least one such QoS parameter. The QoS parameters, identifying the data rates over the bearer(s), are associated with a fixed-time duration. Specifically the fixed-time duration represents a duration over which the parameters identifying the data rates are evaluated/estimated. The parameters may be applicable to a respective MBMS service in general, or may be applicable to a particular session of the MBMS service. For example, the parameters may differ from one session to the next for the same MBMS services. Determining the one or more values comprises receiving the parameters values from another entity, estimating the parameters values or applying predefined values. The parameters identifying data rate(s) of a bearer comprise probabilistic/statistical parameters related to the amount of data offered, on the same bearer, over time intervals with the same time duration equal to the fixed-time duration. Examples of the parameters comprise a mean and/or a variance of the amount of data offered over time intervals with the fixed-time duration, a mean and/or a variance of an average bitrate, a percentile bitrate value, and/or the like. The QoS parameters may also include the fixed-time duration.

The average bitrate represents, for example, a bitrate evaluated over time intervals with the fixed-time duration. The percentile bitrate being associated with a probability of exceedance (POE) value indicating the probability that the bearer bitrate exceeds the percentile bitrate value in any time interval of duration equal to the fixed-time duration. The fixed-time duration value, for example, is a time interval duration that is fixed for a given service, or a given bearer, and may change from one service, or bearer, to another. In other words, each service, or bearer, may have a different fixed-time duration associated with it. In another example, the same fixed-time duration value is used for all services, or all bearers. In yet another example, the fixed-time duration value may be set according to other arrangements defined by a service provider, a network provider, the BM-SC, and or some other entities. In determining the parameters values, the BM-SC 210 may receive the parameters values from another entity such as a service provider or another network entity. Alternatively, the BM-SC 210 may estimate or otherwise apply predefined value(s) of the parameters for the communication bearers, for example, associated with one or more respective MBMS services.

In an example embodiment, such as when the distribution of the bitrate, or the amount, of the data offered on the bearer for a MBMS service may be modeled as a Poisson distribution, one single parameter may be sufficient to describe/define the distribution. However, for example, if the distribution of the bitrate is modeled as a Gaussian distribution, at least two parameters may be used to describe/define the distribution of the average bitrate, or the amount, of data offered over intervals of duration equal to the fixed-time duration.

According to an example embodiment of the invention, the QoS parameters, identifying data rates of one or more bearers, may be communicated between different network entities as parameters distinct from the QoS parameters already contemplated by 3GPP. In another example embodiment however, the parameters may be communicated between different network entities under one or more attributes of the QoS parameters already contemplated by 3GPP. For example, the percentile bitrate, may be communicated under the MBR attribute. Similarly, the average bitrate value may be communicated under the GBR attribute.

As shown in block 410 of FIG. 4, after the BM-SC determines the parameter value(s), the BM-SC 210 signals or otherwise transmits at least one of the parameter value(s) to another network entity, such as the MCE 200. However if, for example, a QoS parameter has a predefined value known to different network entities, then the parameter value is not communicated between the network entities. For example, the fixed-time duration and/or the probability of exeedance (POE) associated with the percentile bitrate may be predefined by an appropriate specification, and may already be known to the one or more network entities other than the BM-SC. For example, the probability of exeedance value may be set as POE=99%, or 0.99. The fixed-time duration, associated with the estimation and/or evaluation of the bitrate, and/or the amount of data, offered over given time intervals may also be set as Averaging Interval=1 second. Notably, if the operator or content provider 215 of a MBMS service does not have prior knowledge of the data rate distribution associated with a bearer, the POE may, for example, be set to 100%, which may reduce to the current MBR setting already defined in 3GPP, and may require the MCE to allocate the MBR per service.

FIG. 5, which illustrate various operations in a method employing concepts of example embodiments of the present invention, as described herein. As shown in block 500, a network entity such as the MCE 200 receives at least one parameter value, for each of one or more communication bearers, where the at least one parameter value, for a communication bearer, describes a data rate probability distribution, for the same bearer, associated with time intervals with a fixed time duration. The MCE estimates an amount of radio resources to allocate to at least one communication bearer of the one or more communication bearers, based at least in part on the received parameter values and the fixed time duration, as shown in block 510. The MCE then allocates the estimated amount of radio resources to the at least one communication bearer of the one or more communication bearers, as shown in block 520.

FIG. 6 illustrates operations that may be performed by the network entity such as the MCE according to a more particular example embodiment of the present invention. Referring now to block 600 of FIG. 6, the MCE 200 determines at least one QoS parameter value for each communication bearer of one or more communication bearers. The at least one QoS parameter value, for a communication bearer, describes a statistical distribution of the data rate, for the same communication bearer, over time intervals of fixed time duration. For example, the MCE 200 may receive the QoS parameters values from the BM-SC 210. Alternatively, the MCE 200 may estimate or otherwise apply predefined value(s) of the QoS parameters for the communication bearers, for example, associated with one or more respective MBMS services. The QoS parameters include, for each EPS bearer, at least one of a mean and/or a variance of the amount of data offered over time intervals with the fixed-time duration, a mean or variance of the average bitrate evaluated over intervals with the fixed time duration, a percentile bitrate value, and/or any other statistical parameters indicative of the distribution of the data rate offered over time intervals with the fixed-time duration. The QoS parameters may further include the fixed-time duration. In some example embodiments, the QoS parameters may amount to giving one quantile of the distribution, e.g., one point on the cumulative distribution function (CDF), of the offered data in an averaging interval for the respective service.

Once the MCE 200 has received, estimated or otherwise applied the predefined QoS parameter(s) values, for example, for the one or more EPS bearers of the respective one or more MBMS services, the MCE 200 allocates radio resources to at least one of the one or more EPS bearers based at least in part on the QoS parameters values and the fixed time duration. Allocating the radio resources comprises, for example, estimating or otherwise calculating the amount of radio resources to allocate to a bearer or a set of bearers to be multiplexed together, as shown in block 610. Allocating the radio resources may also include calculating new QoS parameters values associated with a new fixed time duration. The calculation of the new QoS parameters values include, for example, scaling a data rate variance to correspond to new data rate variance corresponding to the new fixed time duration. In calculating new QoS parameters values, a new statistical distribution of the data rate, corresponding to intervals with the new fixed time duration, is provided.

The MCE may estimate the amount of radio resources in a number of different manners. In one example embodiment, the MCE may estimate the amount of radio resources as a function of a distribution of the offered data for the bearer or set of bearers. This may include first calculating a mean and a variance, e.g., estimating a probability distribution, for a bitrate associated with the set of bearers to be multiplexed together and/or for a bitrate associated with a bearer. For example, if the bitrate distribution for a MBMS service i follows a Poisson distribution and percentile bitrate value is provided, the MCE 200 may estimate or otherwise calculate a mean $m_i$ and a variance $v_i$ of the bitrate as a function of the percentile bitrate value and the POE. Alternatively, for example, when the bitrate distribution follows, or is modeled as, a Gaussian distribution and wherein a percentile bitrate and average bitrate are provided, the MCE 200 may estimate or otherwise calculate a mean $m_i$ and variance $v_i$ of the bitrate as a function of the percentile bitrate and the average bitrate. The MCE 200 may further use the fixed time duration in estimating the probability distribution of the bitrate. For example, the estimated probability distribution of a bearer bitrate or the estimated distribution of the bitrate of a multiplex of bearers may be correspond to a new fixed time duration.

Given the mean $m_i$ and variance $v_i$ of the bitrate, corresponding to a fixed time duration, for each MBMS service i to be multiplexed on a common resource, e.g., MCH channel, the mean and the variance of the cumulative bitrate for the set of multiplexed bearers may be calculated or estimated by summing, respectively, the means and variances for the bearers of the set. In this regard, the MCE may sum the means and variances for the bearers of the set to thereby calculate an estimated mean $m=\text{sum}(m_i)$ and variance $v=\text{sum}(v_i)$ for the set. The distribution of summed independent random variables may be known to be close to Gaussian distribution even with few summed variables, and these mean m and variance v fully characterize a Gaussian distribution.

Given the estimated mean m and variance v of the data rate distribution, corresponding to time intervals with fixed time duration $T_1$, the mean and variance of the data rate distribution, corresponding to time intervals with fixed time duration $T_2$, are equal to mean=m and variance=$v\,(T_1/T_2)$. The transformation from one distribution corresponding to one fixed time duration to another distribution corresponding to another fixed time duration, allows the MCE 200 to optimize/modify the estimated data rate distribution to achieve a reliable allocation of the radio resources.

After calculating the mean and variance of the data rate, the MCE 200 may estimate the amount of radio resources as a function of a distribution of the data rate for the set of bearers, where the distribution may be defined based on a new fixed time duration. If so desired, the MCE may estimate the amount of radio resources further as a function of a desired level of overflow probability, e.g., probability of overflow being less than a probability value p. After estimating the amount of radio resources to allocate to the bearer or set of bearers, the MCE 200 may determine if there are sufficient resources available for the bearer or set of bearers as shown in block 620. For example, the MCE 200 may determine whether the resources offered by a transport channel, to which the bearer or set of bearers may be mapped, are greater than or equal to the estimated amount of radio resources. If sufficient resources are not available, the MCE may delay the bearer or set of bearers for the respective service(s) until sufficient resources are available. Alternatively the MCE may modify the set of bearers such as by deleting one or more bearers from the set, as shown in block 630. The MCE may again calculate, or estimate, an amount of radio resources until the MCE reaches a set of bearers for which sufficient resources are available. If sufficient radio resources are available, or when sufficient resources become available, the MCE may assign the calculated, or estimated, amount of radio resources to the bearer or set of bearers as shown in block 640. The MCE may then indicate the assigned resources to the base station(s) 250, which may map the transport channel to which the bearers are mapped to the assigned resources as shown in block 650. The MCE may further perform the requisite multiplexing of the set of bearers to the respective transport channel.

The allocation of radio resources, in an example embodiment, comprises determining a number of bearers to be multiplexed into a transport channel. Determining the number of bearers to be multiplexed in the transport channel may be performed according to FIGS. 5 and 6, e.g., by estimating the radio resources to be assigned to a set of bearers, comparing the estimated radio resources to the transport channel capacity and updating the bearers and the number of bearers to be multiplexed. The estimation, or calculation, of radio resources may be performed by estimating a probability distribution of a cumulative bitrate for a plurality of bearers to be multiplexed. In another example embodiment the number of bearers to be multiplexed may be fixed and the allocation of radio resources comprises determining the minimum capacity of a transport channel to carry the multiplexed bearers.

The above description is particular to allocating radio resources to one or more bearers of a respective one or more MBMS services. It should be understood, however, that example embodiments of the present invention are equally applicable to determining when one or more bearers may be assigned to radio resources already allocated to one or more other bearers. In such instances, if the radio resources include sufficient capacity, the new bearer(s) may be multiplexed with the already-assigned bearer(s) and provided over the allocated radio resources.

Also, the above description included the MCE 200 calculating a number of mean and variance values for one or more bearers over one or more averaging intervals to thereby define a distribution for those bearer(s). It should also be understood that any of these means and/or variances may be alternatively calculated or otherwise estimated by the BM-SC 210, and signaled or otherwise transmitted to the MCE. The MCE may then determine if sufficient radio resources are available, allocate radio resources to the bearer or set of bearers, and indicate the resources to the base station(s) 250. In these instances, if the set of bearers should be modified, the MCE may communicate the need for a modification to the BM-SC, which may carry out the modification and signal the appropriate mean(s) and variance(s) to the MCE.

According to one aspect of the example embodiments of present invention, the functions performed by the apparatus 300, such as those illustrated by the flowcharts of FIGS. 4, 5 and 6, may be performed by various means. It will be understood that each block or operation of the flowcharts, and/or combinations of blocks or operations in the flowcharts, can be implemented by various means. Means for implementing the blocks or operations of the flowcharts, combinations of the blocks or operations in the flowcharts, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as the memory device 320 of the example apparatus, and executed by a processor, such as the processor 310 of the example apparatus. That is, example embodiments of the present invention may include a computer-readable storage medium having computer-readable program code portions stored therein. The computer-readable storage medium and computer-readable program code portions may be configured to, with at least one processor, cause an apparatus to perform any one or more of the methods or operations of the methods described herein.

As will be appreciated, any such program code instructions may be loaded onto a computer or other programmable apparatus (e.g., processor, memory device, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowcharts by a processor, or storage of instructions associated with the blocks or operations of the flowcharts in a computer-readable storage medium, supports combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
at least one processor; and
at least one memory including computer program code,
the at least one memory and the computer program code configured to, with the at least one processor, cause the apparatus to perform at least the following:
receive at least one parameter value, for each of one or more communication bearers, the at least one parameter value, for a communication bearer, describing a data rate probability distribution, for the same bearer, associated with time intervals with a fixed time duration;
wherein the at least one parameter value comprises at least one of an average data rate value, a data rate variance value, a percentile data rate value associated with a probability value indicating a probability of the data rate value being exceeded, or the probability value, and
wherein the average data rate value, the data rate variance value and the percentile data rate value are associated with time intervals with the fixed time duration;
estimate an amount of radio resources to allocate to at least one communication bearer of the one or more communication bearers, based at least in part on the received parameter values and the fixed time duration; and
allocate the estimated amount of radio resources to the at least one communication bearer of the one or more communication bearers.

2. The apparatus of claim 1, wherein the fixed time duration is one of:
a time duration value received with the parameter values, or
a time duration value already known to the apparatus.

3. The apparatus of claim 1, wherein being configured to cause the apparatus to estimate an amount of radio resources includes being configured to cause the apparatus to at least one of:
estimate an amount of radio resources to allocate to a multiplex of communication bearers as a function of the received parameters values, or
estimate at least one new parameter value describing a data rate probability distribution associated with time intervals with a new fixed time duration, wherein the data rate probability distribution corresponds to at least one of a data rate of a communication bearer or a data rate of a multiplex of communication bearers, and
wherein a multiplex of communication bearers comprises a set of communication bearers multiplexed on a common communication channel.

4. The apparatus of claim 3, wherein being configured to cause the apparatus to estimate an amount of radio resources to allocate to a multiplex of communication bearers includes being configured to cause the apparatus to estimate, for the multiplex of communication bearers, a mean and variance as a function of means and variances of data rates on the respective bearers of the multiplex.

5. The apparatus of claim 3, wherein being configured to cause the apparatus to allocate the estimated amount of radio resources includes being configured to cause the apparatus to allocate the estimated amount of radio resources to the multiplex of communication bearers, and wherein the at least one memory and the computer program code are further configured to, with the at least one processor, cause the apparatus to further perform the following:
determine if sufficient radio resources are available for the multiplex of communication bearers as a function of the estimated amount of radio resources; and
modify the communication bearers forming the multiplex of communication bearers when sufficient radio resources are not available.

6. The apparatus of claim 5, wherein being configured to cause the apparatus to determine if sufficient radio resources are available and modify the communication bearers forming the multiplex of communication bearers when sufficient radio resources are not available includes being configured to cause the apparatus to repeatedly determine if sufficient radio resources are available and modify the communication bearers forming the multiplex of communication bearers when sufficient radio resources are not available until the modified multiplex of communication bearers has sufficient radio resources available.

7. The apparatus of claim 1, wherein the at least one memory and the computer program code are further configured to, with the at least one processor, cause the apparatus to further perform the following:
prepare an indication of the allocated resources or the at least one communication bearer assigned to allocated resources for transmission to one or more base stations for scheduling the at least one communication bearer on the allocated radio resources.

8. A method comprising:
receiving at least one parameter value, for each of one or more communication bearers, the at least one parameter value, for a communication bearer, describing a data rate probability distribution, for the same bearer, associated with time intervals with a fixed time duration;
estimating an amount of radio resources to allocate to at least one communication bearer of the one or more communication bearers, based at least in part on the received parameter values and the fixed time duration; and
allocating the estimated amount of radio resources to the at least one communication bearer of the one or more communication bearers,
wherein receiving at least one parameter value, estimating an amount of radio resources and allocating the estimated amount of radio resources are performed by an apparatus including at least one processor and at least one memory including computer program code, the at least one memory and the computer program code being configured to, with the at least one processor, cause the apparatus to receive at least one parameter value, estimate an amount of radio resources and allocate the estimated amount of radio resources;
wherein the at least one parameter value comprises at least one of an average data rate value, a data rate variance value, a percentile data rate value associated with a probability value indicating a probability of the data rate value being exceeded, or the probability value, and
wherein the average data rate value, the data rate variance value and the percentile data rate value are associated with time intervals with the fixed time duration.

9. The method of claim 8, wherein the fixed time duration is one of:
a time duration value received with the parameter values, or
a time duration value already known to the apparatus.

10. The method of claim 8, wherein estimating an amount of radio resources comprises at least one of:
estimating an amount of radio resources to allocate to a multiplex of communication bearers as a function of the received parameters values, or
estimating at least one new parameter value describing a data rate probability distribution associated with time intervals with a new fixed time duration, wherein the data rate probability distribution corresponds to at least one of a data rate of a communication bearer or a data rate of a multiplex of communication bearers, and wherein a multiplex of communication bearers comprises a set of communication bearers multiplexed on a common communication channel.

11. The method of claim 10, wherein estimating an amount of radio resources to allocate to a multiplex of communication bearers comprises estimating, for the multiplex of communication bearers, a mean and variance as a function of means and variances of data rates on the respective bearers of the multiplex.

12. The method of claim 10, wherein allocating the estimated amount of radio resources comprises allocating the estimated amount of radio resources to the multiplex of communication bearers, and wherein the method further comprises:

determining if sufficient radio resources are available for the multiplex of communication bearers as a function of the estimated amount of radio resources; and modifying the communication bearers forming the multiplex of communication bearers when sufficient radio resources are not available.

13. The method of claim 12, wherein determining if sufficient radio resources are available and modifying the communication bearers forming the multiplex of communication bearers when sufficient radio resources are not available comprise repeatedly determining if sufficient radio resources are available and modifying the communication bearers forming the multiplex of communication bearers when sufficient radio resources are not available until the modified multiplex of communication bearers has sufficient radio resources available.

14. The method of claim 8 further comprising:

preparing an indication of the allocated resources or the at least one communication bearer assigned to allocated resources for transmission to one or more base stations for scheduling the at least one communication bearer on the allocated radio resources.

15. A computer program product comprising a non-transitory computer readable storage medium having computer-readable program code portions stored therein, the non-transitory computer-readable storage medium and computer-readable program code portions being configured to, with at least one processor, cause an apparatus to perform at least the following:

receive at least one parameter value, for each of one or more communication bearers, the at least one parameter value, for a communication bearer, describing a data rate probability distribution, for the same bearer, associated with time intervals with a fixed time duration;

wherein the at least one parameter value comprises at least one of an average data rate value, a data rate variance value, a percentile data rate value associated with a probability value indicating a probability of the data rate value being exceeded, or the probability value, and wherein the average data rate value, the data rate variance value and the percentile data rate value are associated with time intervals with the fixed time duration;

estimate an amount of radio resources to allocate to at least one communication bearer of the one or more communication bearers, based at least in part on the received parameter values and the fixed time duration; and allocate the estimated amount of radio resources to the at least one communication bearer of the one or more communication bearers.

16. A system comprising:

a broadcast/multicast service center configured to determine at least one parameter value, for each of one or more communication bearers, the at least one parameter value, for a communication bearer, describing a data rate probability distribution, for the same bearer, associated with time intervals with a fixed time duration, wherein the broadcast/multicast service center is also configured to transmit the determined parameter values;

wherein the at least one parameter value comprises at least one of an average data rate value, a data rate variance value, a percentile data rate value associated with a probability value indicating a probability of the data rate value being exceeded, or the probability value, and wherein the average data rate value, the data rate variance value and the percentile data rate value are associated with time intervals with the fixed time duration; and a network server configured to receive the determined parameter values, and estimate an amount of radio resources to allocate to at least one communication bearer of the one or more communication bearers, based at least in part on the received parameter values and the fixed time duration, wherein the network server is also configured to allocate the estimated amount of radio resources to the at least one communication bearer of the one or more communication bearers.

17. The system of claim 16, wherein the fixed time duration is one of:

a time duration value received with the parameter values, or a time duration value already known to the apparatus.

18. The system of claim 16, wherein network server being configured to estimate an amount of radio resources includes being configured to at least one of:

estimate an amount of radio resources to allocate to a multiplex of communication bearers as a function of the received parameters values, or estimate at least one new parameter value describing a data rate probability distribution associated with time intervals with a new fixed time duration, wherein the data rate probability distribution corresponds to at least one of a data rate of a communication bearer or a data rate of a multiplex of communication bearers, and wherein a multiplex of communication bearers comprises a set of communication bearers multiplexed on a common communication channel.

* * * * *